Sept. 29, 1964  P. E. REITEMEIER  3,150,998
FUEL CELL SYSTEMS
Filed March 5, 1962  2 Sheets-Sheet 1
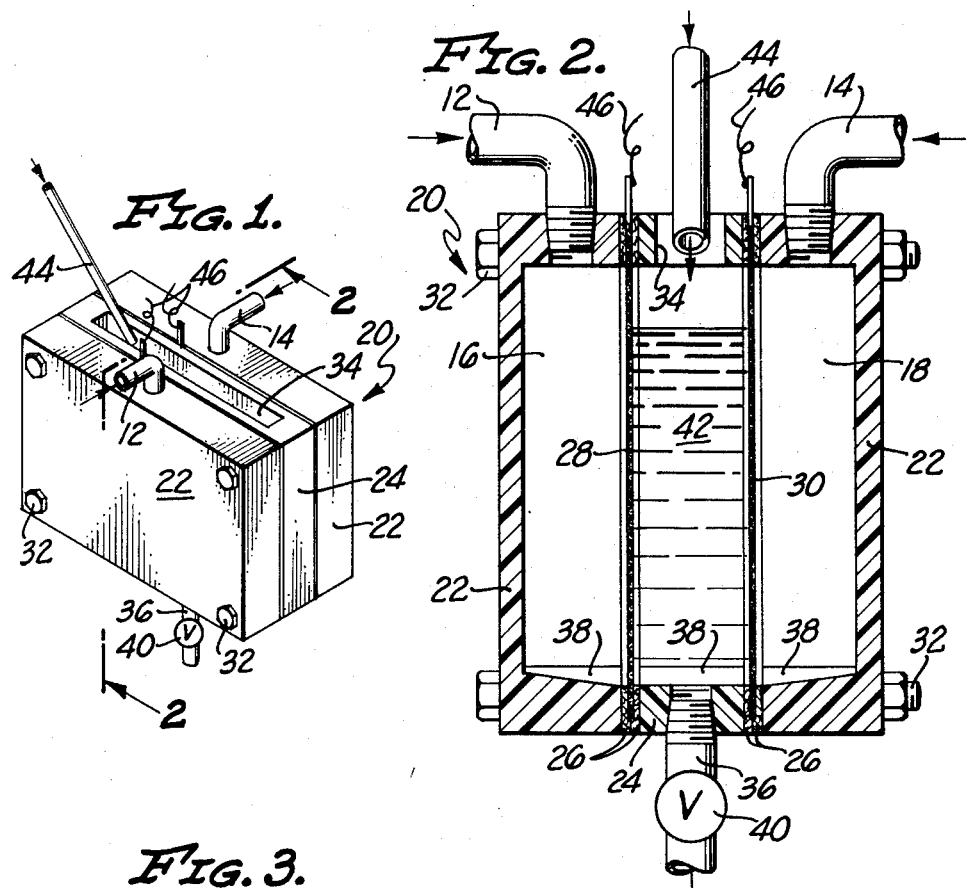
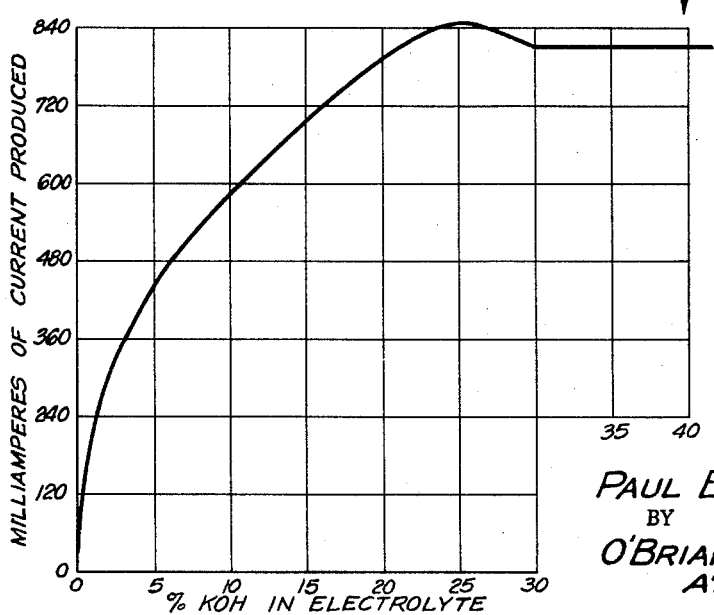
INVENTOR.
PAUL E. REITEMEIER
BY
O'BRIAN & BLACKHAM
ATTORNEYS Sept. 29, 1964

P. E. REITEMEIER 3,150,998

FUEL CELL SYSTEMS

Filed March 5, 1962

INVENTOR.
PAUL E. REITEMEIER
BY
O'BRIAN & BLACKHAM
ATTORNEYS

United States Patent Office 3,150,998
Patented Sept. 29, 1964

3,150,998
FUEL CELL SYSTEMS
Paul E. Reitemeier, 1136 Torry Place, Anaheim, Calif.
Filed Mar. 5, 1962, Ser. No. 177,396
8 Claims. (Cl. 136—86)

This invention pertains to new and improved fuel cell systems and to a process for obtaining electrical energy and by-products from gases having a relative low economic value.

Although the gas hydrogen sulfide can and is treated or reacted so as to obtain different products having a commercial value in many industries, this gas remains essentially an economic problem. It is such a problem since because of its inherent physical properties such as odor it cannot be released to the atmosphere in the same manner in which a number of other by-product gases are disposed of.

An object of the present invention is to provide new and improved processes for utilizing waste hydrogen sulfide so as to achieve economic value from this material. A related object of the present invention is to provide processes of this type which can be utilized so as to produce electrical energy and by-products capable of being sold as articles of commerce. A further object of the present invention is to provide a fuel cell system based upon utilization of hydrogen sulfide and sulfur dioxide in order to produce electrical energy and such by-products. Another object of this invention is to provide fuel cells containing as reactants hydrogen sulfide and sulfur dioxide.

These and various other objects of this invention as well as many specific advantages of it will be more fully apparent from a detailed consideration of the remainder of this specification including the appended claims and the accompanying drawing in which:

FIG. 1 is a perspective view of a fuel cell utilized in accordance with this invention;

FIG. 2 is a cross-sectional view taken at line 2—2 of FIG. 1;

FIG. 3 is a curve showing the relationship of current produced to electrolyte concentration during the utilization of this cell;

Figure 4:
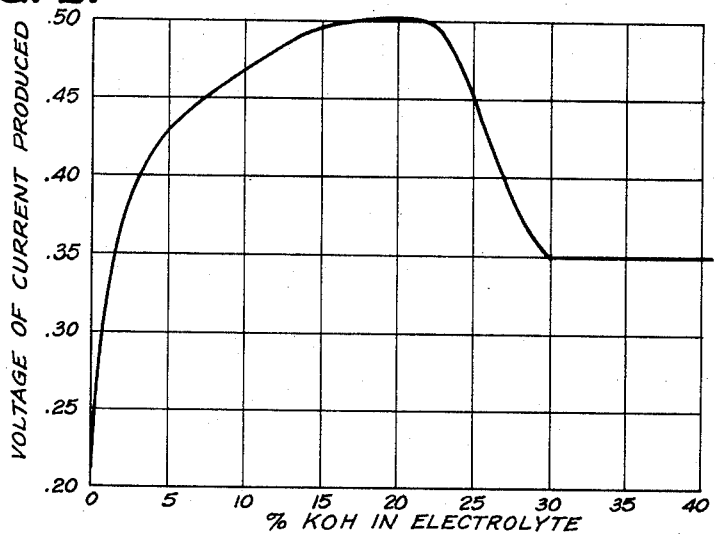
FIG. 4 is a curve showing the relationship of voltage obtained to electrolyte concentration during the use of this cell.

The accompanying drawing is primarily intended for explanatory purposes. From a careful consideration of the remainder of this specification and the accompanying drawing it will be realized that the various figures of this drawing primarily indicate what can be expected during the operation of a fuel cell or fuel cell system in accordance with this invention, and that this invention is not restricted to any specific housing or similar cell structure.

As an aid to understanding this invention it can be stated in essentially summary form that it concerns a fuel cell system in which the gases hydrogen sulfide and sulfur dioxide are admitted through porous anodes and cathodes, respectively, into an electrolyte so as to produce electrical energy which may be obtained through the use of terminals on these electrodes and so as to obtain products such as sulfur and an alkaline sulfite in the electrolyte.

In a sense the reference to the use of sulfur dioxide in a fuel cell or fuel cell system in accordance with this invention in the preceding brief summary is misleading inasmuch as the principal raw material or reactant which it is preferred to utilize in practising this invention is the gas hydrogen sulfide. As indicated in the initial portions of this specification this gas is essentially a waste commodity even though it is capable of being utilized in different manners. Preferably in practising this invention hydrogen sulfide from an oil refinery or the like is continuously divided into two different streams, one of which contains twice as much gas as the other, and the smaller of these streams is burned in oxygen so as to produce sulfur dioxide in accordance with the following equation:

$$2H_2S + 3O_2 = 2SO_2 + 2H_2O$$

Virtually any convenient source of oxygen can be utilized in order to burn the hydrogen sulfide in accordance with this equation. It is presently considered that prefered results can be achieved by utilizing relatively pure so-called "tonnage" oxygen containing significant quantities of various relatively inert gases, although purer forms of oxygen may be used in practising the present invention. If desired, the hydrogen sulfide may be burned in air so as to produce sulfur dioxide.

Following this the sulfur dioxide and any entrained gas resulting from the burning of the one stream of hydrogen sulfide and the other stream of hydrogen sulfide are passed through appropriate pipes 12 and 14 leading into the interiors of the anode and cathode gas chambers 16 and 18, respectively, within a complete fuel cell 20. Although this cell 20 can be constructed in a number of different manners in accordance with known practice, the particular cell 20 illustrated is formed so as to utilize inert, electrically non-conductive ends 22 and a similar frame-like spacer 24. In this cell 20 appropriate electrically non-conductive gaskets 26 are located on the surfaces of the ends 22 and the spacer 24 spaced from one another, and porous, inert metal anodes and cathodes 28 and 30 are located between gaskets 26 so as to be held in place between the ends 22 and the spacer 24. This whole assembly may be secured together in a number of different ways such as, for example, through the use of bolts 32.

From this it will be seen that the pipes 12 and 14 are attached to the ends 22 of the cell 20, and that the chambers 16 and 18 are formed within these ends. Preferably a top opening 34 is provided in the spacer 24, and a drain pipe 36 is connected to the bottom of the spacer 24. In order to facilitate draining of the chambers 16 and 18 and of the spacer 24 sloping walls 38 are provided leading to the drain pipe 36. Preferably a valve 40 is located in this drain pipe 36.

In the cell 20 the interior of the spacer 24 is normally filled with a weak alkaline or caustic electrolyte 42 which may be introduced into this cell 20 through a top pipe 44 leading through the top opening 34. Further, in order to complete the cell 20 conventional terminal wires 46 are attached to the anode and cathodes 28 and 30 for the purpose of conveying electrical power from this cell.

As the cell 20 is operated the sulfur dioxide and hydrogen sulfide are introduced into the anode and cathode and chambers 16 and 18 under a sufficient pressure so as to maintain these chambers substantially free from electrolyte, but at a low enough pressure so that any bubbling of either of these gases through the electrolyte 42 is held to a minimum or is substantially absent. As these gases are passed to the cell 20 they will be broken up by means of the pores of the anode and cathode 28 and 30 so as to tend to facilitate the gases dissolving in the solution with a minimum amount of gases escaping as bubbles through the electrolyte 42. Preferably the sides of the pores within the anode and cathode 28 and 30 respectively are such as to facilitate ionization.

It is presently considered that the dimensions of the openings within the anode and cathode 28 and 30 should be no larger than 50 mesh standard Tyler screen size in dimension and that particularly satisfactory results can be achieved with the dimensions of the openings in the anode and cathode 28 and 30 being from about 50 to about 400 mesh standard Tyler screen size. These particular anodes and cathodes may be created so as to have openings of these dimensions from either wire screening, sintered metal or the like.

The electrolyte 42 utilized in the cell 20 is, as indicated in the preceding paragraph, preferably a weak caustic solution. A considerable variation in the output of this cell 20 is obtainable depending upon the precise nature of the electrolyte employed. Presently preferred results are achieved utilizing aqueous solutions of the alkali metal solutes such as potassium or sodium hydroxide. It will, of course, be recognized that in an electro-chemical cell these two solutes perform substantially the same.

In FIGS. 3 and 4 of the drawing it is shown that the voltage which may be obtained from a cell such as the cell 20 held at a given temperature will gradually increase with increases in concentration of potassium hydroxide as the only solute in an aqueous electrolyte up until a maximum of about 20% by weight of this solute is present in the electrolyte, and that as further increases in concentration of this solute are made the voltage obtainable at such a temperature will fall off until about a maximum of about 30% of this solute is present in the electrolyte, and that then the voltage obtainable in a particular cell will remain relatively constant as further increases in solute concentration are made in the electrolyte up to about 40% by weight of the particular solute noted.

It will also be noted from a study of these two figures of the drawing that increasing amounts of potassium hydroxide as the only solute in an aqueous electrolyte employed in a cell such as the cell 20 will cause increases in current obtained at a given temperature from this cell up to a maximum of about 25% potassium hydroxide solute being present in the electrolyte, and that then the current produced will fall off a slight bit as the amount of solute is increased to about 30% by weight and that it will remain relatively constant as further increases in solute concentration are made up to about 40% by weight. The results shown in FIGS. 3 and 4 were obtained with the electrodes located approximately 1½ inches apart.

Figure 5:
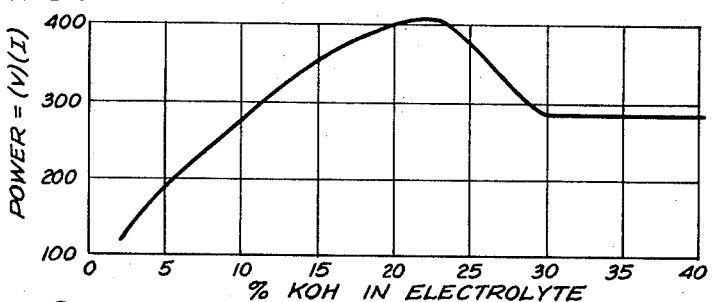
FIG. 5 is a curve derived from FIGS. 3 and 4 showing the relationship of power obtained during the operation of this cell to electrolyte concentration.

From these curves shown in FIGS. 3 and 4 it is possible to compute the power output of a cell such as the cell 20 by multiplying the current times the voltage. The nature of the power output of a cell as herein described is shown in FIG. 5 of the drawing. From this it will be seen that within concentrations of from about 10 to about 30% by weight of solute within the aqueous electrolyte a maximum amount of power will be achieved, with the peak amount of power being achieved with a solute concentration of about 22½% by weight.

From the foregoing it will be seen that for maximum production of power within a cell such as the cell 20 the concentration of the solute should be from about 10 to 30% by weight. However, this does not indicate what may be considered to be the whole story with respect to the present invention. During the operation of a cell such as the cell 20 an important reaction may be expressed by the following equation:

$$SO_2 + 2H_2S = 3S + 2H_2O$$

Other reactions which are not completely understood or identified at this time take place within such a cell yielding various reaction products such as an alkali metal sulfide and presumably other sulfur compounds. The particular reaction yielding sulfur is considered to be more predominant with a relatively low solute concentration in the electrolyte. During the operation of a cell such as a cell 20 significant quantities of sulfur are produced when the concentration of the solute is within a range of from about 1% to about 10% by weight.

Hence, in accordance with this invention a fuel cell should be operated with an electrolyte concentration which is dependent upon the economic importance of power and the reaction products produced within this cell. Thus, if economics make it desirable to produce significant amounts of sulfur along with electrical energy the electrolyte used should be comparatively weak while if power is a prime consideration the electrolyte should be comparatively strong, preferably within the range of from about 10% to about 30% by weight.

These considerations must be evaluated along with the economics pertaining to the electrolyte 42 employed for any specific application of the present invention. One of the advantages of the present invention lies in the fact that in a fuel cell such as a fuel cell 20 the electrolyte can be virtually any weak caustic solution which is too spent for further use in a chemical plant. Thus, for example, caustic solutions of virtually any alkali metal containing a number of different contaminant ions incapable or substantially incapable of affecting the operation of the cell 20 can be used as the electrolyte 42 in a cell such as the cell 20. It is considered that in many cases it will be uneconomic to concentrate such electrolytes in accordance with known precesses in order to increase the power output of a fuel cell operated in accordance with this invention.

Because of the fact that various by-products are produced within a fuel cell as described herein it is normally preferred to continuously change the electrolyte present within a cell such as a cell 20 operated in accordance with this invention. This is preferably done by continuously introducing new electrolyte through the pipe 44 while removing contaminated electrolyte through the drain pipe 36. Of course, the electrolyte used with a cell such as the cell 20 may be recirculated and may be purified by known filtration and/or by other methods so as to remove by-products during such recirculation.

Figure 6:
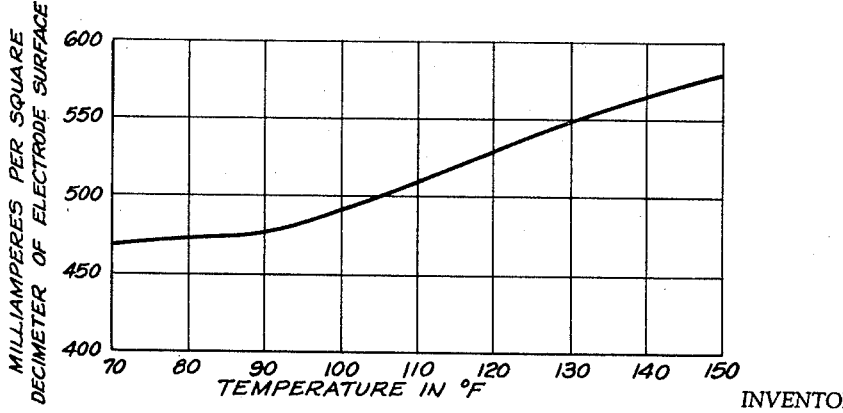
FIG. 6 is a curve showing the relationship of current produced to the temperature at which this cell is operated.

In any particular cell such as the cell 20 with a particular concentration of electrolyte the voltage produced will remain relatively constant while the amount of current produced will increase gradually with temperature as indicated in FIG. 6 of the drawing. In this figure both the voltage and the current from the particular cell such as the cell 20 utilizing an 8% potassium hydroxide electrolyte is shown. Because of this variation a cell such as the cell 20 as herein described should in general be operated at as elevated a temperature as conveniently possible without causing any economic loss because of the cost of heating the electrolyte beyond the temperature to which this electrolyte is heated by reactions taking place in the cell. The cell should, of course, be operated at sufficiently low temperatures so that boiling does not occur within it. If desired during recirculation of an electrolyte as discussed in a preceding paragraph the recirculated electrolyte may be heated in accordance with known practice so as to maintain any specific desired cell temperature.

From the foregoing it will be apparent that the present invention may be applied in a number of different manners depending upon various specific requirements so as to utilize different types of electrolytes and so as to produce greater or smaller quantities of certain by-products and so as to produce different voltages and currents. Because of the latitude of the ways in which the present invention can be applied it is to be considered as being limited solely by the appended claims forming a part of this disclosure.

I claim:
1. A fuel cell which includes:
   a porous anode having sides;
   a porous cathode having sides, said cathode being spaced from said anode;
   gas chamber means for containing sulfur dioxide located on one side of said anode;
   other gas chamber means for containing hydrogen sulfide located on the other side of said anode;
   means for containing an electrolyte between said anode and said cathode extending between the other side of said anode and the other side of said anode;
an aqueous alkaline electrolyte means containing a solute selected from the group consisting of sodium and potassium compounds, said electrolyte means being located within said means for containing an electrolyte;
hydrogen sulfide located within said gas chamber means for containing hydrogen sulfide; and
sulfur dioxide located within said chamber means for containing sulfur dioxide; and
said electrolyte means being contacted by said hydrogen sulfide and said sulfur dioxide because of the porosity of said anode and said cathode, enabling said hydrogen sulfide and said sulfur dioxide to react within said electrolyte means.

2. A fuel cell as defined in claim 1 wherein said electrolyte comprises an aqueous solution of a solute selected from the group consisting of sodium and potassium hydroxides.

3. A fuel cell as defined in claim 2 wherein said electrolyte contains from about 10 to about 30 percent by weight of solute.

4. A fuel cell as defined in claim 2 wherein said electrolyte contains from about 1 to about 10 percent by weight of solute.

5. In a fuel cell including a porous anode and a porous cathode spaced from one another and separate gas chamber means on the sides of said anode and said cathode remote from one another an electro-chemical system which comprises: an aqueous alkaline electrolyte means containing a solute selected from the group consisting of sodium and potassium alkaline compounds, said electrolyte means being located between said anode and said cathode; hydrogen sulfide within said gas chamber means next to said anode and permeating said anode so as to extend into said electrolyte; sulfur dioxide positioned within the other of said gas chamber means and permeating said cathode so as to extend into said electrolyte; said sulfur dioxide and said hydrogen sulfide being present so as to be able to react with one another within said electrolyte means.

6. A process of operating a fuel cell which comprises: introducing hydrogen sulfide into an aqueous electrolyte means containing a solute selected from the group consisting of sodium and potassium alkaline compounds through a porous anode serving to disperse said hydrogen sulfide while simultaneously introducing sulfur dioxide into the said electrolyte through a porous cathode serving to disperse said sulfur dioxide while said sulfur dioxide and said hydrogen sulfide react so as to produce electricity.

7. A process as defined in claim 6 wherein said electrolyte contains from about 10% to about 30% by weight of solute.

8. A process as defined in claim 7 wherein said electrolyte contains from about 1% to about 10% by weight of solute.

References Cited in the file of this patent
UNITED STATES PATENTS

| | | |
|---|---|---|
| 567,721 | Payson | Sept. 15, 1896 |
| 2,901,523 | Justi et al. | Aug. 25, 1959 |
| 3,031,518 | Werner | Apr. 24, 1962 |